3,309,275
SEROLOGICAL INHIBITION TEST FOR PREGNANCY

Margaret Treacy, Somerville, N.J., assignor to Ortho Pharmaceutical Corporation, a corporation of New Jersey
No Drawing. Filed Aug. 23, 1963, Ser. No. 304,275
20 Claims. (Cl. 167—84.5)

This invention relates generally to a method for the in vitro serological determination of human chorionic gonadotrophin (hereinafter referred to as HCG) and more particularly, relates to a reagent for the serological determination of pregnancy by detection of HCG in urine and the method of preparing the reagent.

HCG is produced during pregnancy by the placenta and is found shortly after nidation in serum and urine. HCG is secreted in the urine of pregnant women and is not found in the urine of non-pregnant women except non-pregnant women afflicted with certain pathological conditions—such as chorionic tissue tumors. It is generally considered that except for women afflicted with certain pathological conditions, the presence of HCG in the urine and serum is a reliable indication of pregnancy. A number of prior art pregnancy tests are based on biological in vivo methods for determining the presence of HCG. The Aschheim-Zondek test is based on the ability of HCG injected subcutaneously in mice to produce corpora lutea. In spite of the consistent accuracy of this test, it is not presently used widely in the United States because of the long intervals before results are available, the difficulty of maintaining a large supply of animals of the required age, and the need for multiple injections. Another disadvantage is that a considerable number of animals are killed because of the toxicity of the test urine. Another biological test for pregnancy which is widely used is known as the Friedman test. In this test, a mature female rabbit that has been isolated three to four weeks is used as a test animal. A sample of the urine to be tested is injected into the ear vein of the rabbit and forty-eight hours after the injection, the ovaries are examined for ruptured hemorrhagic follicles, which indicate a positive reaction. One advantage of this test is that the animal need not be sacrificed but may be used again within four to six weeks. The Friedman test largely eliminates the objections to the Aschheim-Zondek mouse test and is almost as accurate. A disadvantage of the Friedman test is that animal cost is high if the animal is sacrificed and otherwise requires prolonged animal husbandry.

Immature female rats are used in another biological pregnancy test. The urine to be tested is injected subcutaneously into rats and the following morning the animals are killed. The ovaries are dissected and inspected for enlargement and the presence of reddening or red spots. A major disadvantage of this test is the difficulty in differentiating a slightly pinkish negative ovary from a reddened positive ovary and high accuracy can be maintained only by skilled technicians.

Frogs and toads have also been used for pregnancy testing, but there animals are relatively insensitive when compared with mice, rats and rabbits so that it is frequently necessary to concentrate the urine to be tested in order to increase the concentration of HCG.

It is a primary object of my invention to overcome the drawbacks of the prior art pregnancy tests based on biological methods by providing a serodiagnostic method of determining pregnancy.

It is another object of my invention to provide a serodiagnostic method for determining pregnancy by the in vitro determination of HCG in urine.

It is still another object of my invention to provide a serological test reagent useful in determining pregnancy in the form of an HCG-synthetic resin particle combination which comprises a suspension of synthetic resin particles which will adsorb protein to their surface having HCG, the physical characteristics of which have been altered without altering the immunological characteristics, adsorbed on the surface of the particles (hereinafter referred to as "latex reagent").

It is another and further object of my invention to provide a serodiagnostic method for determining pregnancy which does not require special equipment and may be accomplished within a few minutes.

I have made the discovery that the difficulties inherent in biological in vivo methods for the determination of pregnancy may be overcome and the objects of this invention accomplished by providing a latex reagent and an in vitro serological pregnancy test based upon the use of the latex reagent in the determination of HCG in the urine of pregnant women, which is highly accurate, requires only a few minutes for its completion and does not require the use of special equipment or skills for its correct interpretation.

In the test of my invention, the reagents are the latex reagent and an HCG antiserum. The test is an inhibition test and is made by mixing the antiserum with a small amount of the urine to be tested and then mixing the latex reagent with the antiserum-urine mixture. If the urine being tested contains HCG, there is a reaction between the HCG and the antibody of the antiserum so that the antibody is not available to react with the HCG on the particles of the latex reagent. If there is no HCG in the urine tested, the HCG on the particles reacts with the antibody of the antiserum and this is evidenced by agglutination of the particles of the latex reagent.

The antiserum is produced by injecting into rabbits partially purified HCG obtained from the urine of pregnant women. After about five weeks, the rabbits are bled and the sera collected. The serum of each rabbit is tested against HCG of known concentration, and the antisera which give a positive reaction with a low concentration of HCG are pooled. The concentration of antibody in the pooled antisera is determined by the use of HCG of known concentration, so that the amount of HCG required to react completely with the antibody in the pooled antisera is accurately determined. (E. A. Kabat and M. M. Mayer, Experimental Immunochemistry, 2nd Ed., 1961, pp. 22–90.)

The latex reagent is prepared by adding an aqueous solution of HCG slowly and with constant stirring to a suspension of the particles of a synthetic resin capable of adsorbing protein to its surface which results in an HCG-resin particle combination in which HCG is adsorbed on the particles.

The particles are approximately spherical and have an average diameter within the range of from about 0.07 micron to about 0.90 micron; the preferred average diameter is about 0.81 micron. The concentration of particles in the latex reagent may be within the range of from about 0.5% to about 1.5% by weight; however, it is preferred that a suspension be used in which the concentration of particles is within the range of from about 0.8% to about 1.2% by weight. If the concentration of particles in the suspension is less than about 0.5% by weight, agglutination of the particles does not readily occur; and when it occurs, it is not readily observed. If the concentration of particles in the suspension is above about 1.5% by weight, the number of particles is too great to allow accurate determination of whether or not agglutination has occurred.

The HCG used in preparing the HCG solution should be relatively pure. HCG which assays at least about 1700 and preferably between about 1700 and about 3000 international units per milligram has been found satisfactory.

The HCG should not assay less than about 1700 international units per milligram as otherwise the amount of foreign protein present with the HCG is such that a significant amount thereof is also adsorbed onto the particles which interferes with the inhibition test by preventing agglutination.

The HCG solution used in preparing the latex reagent contains an amount of HCG within the range of from about 720 to about 900 international units of HCG per milliliter. The preferred amount is about 840 international units of HCG per milliliter. If the HCG solution contains less than about 720 international units of HCG per milliliter, the particles are not fully immunologically coated so that there is some exposed particle surface which adsorbs foreign protein from the test urine and interferes with the reaction. If the HCG solution contains more than about 900 international units of HCG per milliliter, there is an excess of HCG which remains in the latex reagent as unadsorbed HCG which reacts preferentially with the HCG antibody of the antiserum so that the antibody is not available to react with the HCG of the latex reagent and thereby prevents agglutination which would have otherwise taken place. The latex suspension to be treated with HCG contains between about 1.8% and 2.2% by weight of particles.

In order for the latex reagent to function satisfactorily in the inhibition test, the HCG of the latex reagent must have the ability to react rapidly and completely with the antibodies of the antiserum and result in readily observable agglutination of the particles of the latex reagent. This requires "alteration" of the HCG. The alteration effects a change in the physical characteristics of the HCG, but does not change the immunological characteristics of the HCG. This alteration may be accomplished by aging the latex reagent or simulating and hastening the aging process by a variety of treatments including heating of the latex reagent or the application of both digestive enzymatic treatment and heat to the HCG solution prior to its adsorption on the latex particles or to the latex reagent.

Alteration of the latex reagent may be accomplished by heating the material slowly to a temperature of about 96° C., cooling it to about 50° C. and maintaining it at that temperature from about four to about six weeks; or bringing the material slowly to a temperature of about 50° C. and maintaining it at that temperature for a period of about two to about three months.

Alteration of the latex reagent by the use of both enzyme and heat may be accomplished by adding to the latex reagent, which has a pH within the range of about 8.0 to about 9.0 and preferably 8.2, an aqueous solution of trypsin containing, by weight, one-tenth the weight of the latex particles in the latex reagent, bringing the latex reagent slowly to a temperature of 50° C. and maintaining it at that temperature for a period of about two to about four weeks.

Alteration by the use of a combination of enzyme and heat may also be accomplished by enzyme treatment of the HCG before it is adsorbed on the latex particles and by heat treatment thereafter. According to this method, an aqueous trypsin solution, which is adjusted to a pH of from about 6.8 to about 7.2, and preferably at a pH of about 7.1, is added to an aqueous solution of HCG, which has been adjusted to the same pH, subjecting the resulting solution to heat which comprises heating it to a temperature of about 37° C. and maintaining it at that temperature for about one hour, buffering the HCG solution to a pH within the range of from about 8.0 to about 9.0 and preferably 8.7 adding the altered HCG solution slowly with stirring to the latex suspension which is also buffered to a pH within the range of about 8.0 to about 9.0, preferably 8.7 and subjecting the resulting material to heat consisting of bringing the material slowly to a temperature of about 50° C. and maintaining it at that temperature for about two to about four weeks.

Following the alteration of the latex reagent, the latex reagent is buffered to a pH within the range of about 7.8 to about 8.8. If the pH is below about 7.8 or above about 8.8 the stability of the reagent is decreased to an extent that the accuracy of the inhibition test is unsatisfactory.

Latex reagent prepared in the above manner has about 36 to about 45 international units of HCG per milligram of latex particle weight. The preferred amount is from about 40 to about 42 international units per milligram of latex particle weight. If the amount is less than about 36 international units of HCG per milligram of latex particle weight, there is so much immunologically uncoated, exposed particle surface that foreign protein from the test urine may be adsorbed on the particle surface and interfere with the reaction which would otherwise have taken place. If the amount is greater than about 45 international units of HCG per milligram of latex particle weight, there is excess HCG present which is not adsorbed on the particles and the unadsorbed HCG reacts preferentially with the HCG antibody of the antiserum so that the antibody is not available to react with the HCG of the latex reagent and thereby agglutination which would otherwise have taken place does not occur.

The synthetic resins suitable for adsorbing HCG in the preparation of the latex reagent must be capable of adsorbing protein and must be capable of being prepared in spherical or near spherical shape having an average diameter of from about 0.07 to about 0.90 micron. Examples of suitable synthetic resins are polystyrene and polymethacrylic resins.

The following examples of the preparation of the latex reagent are given as specific illustrations. It is to be understood, however, that the invention is not to be limited to the specific details of the examples.

*Example 1.*—3.6 milliliters of a suspension of polystyrene particles, in which the particles had an average diameter of 0.81 micron and the concentration of particles was 28.32% by weight, were added to 46.4 milliliters of an aqueous buffer solution having a pH of 8.2. The buffer solution was prepared by dissolving 6.675 grams of sodium borate, 8.04 grams of boric acid, and 9.0 grams of sodium chloride in sufficient distilled water to bring the volume to one liter. 50 milliliters of an aqueous HCG solution containing 40,000 international units of HCG, which was buffered at a pH of 8.2 with the same buffer solution as above, were slowly added to the buffered suspension with constant stirring. The resulting material was slowly brought to a temperature of 50° C. and maintained at that temperature for a period of three months.

*Example 2.*—Latex reagent was prepared as in Example 1 except that just after the buffered HCG solution was added to the buffered, polystyrene suspension, the mixture was slowly brought to a temperature of 96° C., with frequent stirring, cooled promptly thereafter to a temperature of 50° C. and maintained at that temperature for a period of six weeks.

*Example 3.*—3.6 milliliters of a suspension of polystyrene particles in which the particles had an average diameter of 0.81 micron were added slowly to 36.4 milliliters of the same buffer solution used in Example 1. 50 milliliters of an aqueous HCG solution, which was buffered at a pH of 8.2 with the same buffer solution used in Example 1 and contained 40,000 international units of HCG, were slowly added to the buffered suspension with constant stirring. The resulting material was brought to a temperature of 5° C. and maintained at that temperature for sixteen hours. Ten milliliters of a 1% aqueous trypsin solution were then added with stirring to the buffered suspension. The resulting material was brought to a temperature of 50° C. and maintained at that temperature for four weeks.

*Example 4.*—42,000 international units of HCG were dissolved in 4.5 milliliters of an aqueous buffer solution having a pH of 7.1. The buffer solution was prepared by dissolving 1.907 grams of sodium borate, 11.133 grams of boric acid, 9.0 grams of sodium chloride, and 5.54 grams of calcium chloride in sufficient distilled water to bring the volume to one liter. An aqueous solution of trypsin prepared by dissolving an amount of crystalline trypsin in distilled water equal to one-tenth the weight of 42,000 international units of HCG was added slowly with stirring to the buffered HCG solution. The resulting solution was brought to a temperature of 37° C. and maintained at that temperature for one hour, and then a sufficient amount of a buffer solution, having the composition of the buffer solution of Example 1, was added to bring the volume to 50 milliliters. Thus the diluted HCG solution has a pH of 8.2. The buffered HCG solution was added slowly with constant stirring to 50 milliliters of a two percent by weight suspension of polystyrene particles in which the particles had an average diameter of 0.81 micron. The suspension was buffered at a pH of 8.2 with an aqueous buffer having the same composition as that of Example 1. The resulting material was brought slowly to a temperature of 50° C. and maintained at that temperature for three weeks.

*Example 5.*—42,000 international units of HCG were dissolved in 4.5 milliliters of distilled water which had been adjusted to a pH of 7.1. An amount of crystalline trypsin equal to one-tenth the weight of 42,000 international units of HCG was dissolved in twenty milliliters of distilled water which had been adjusted to a pH of 7.1. The enzyme solution was added to the HCG solution and the resulting solution was maintained at a temperature of 37° C. for one hour and then diluted to 50 milliliters with distilled water which had been adjusted to pH 9 with an aqueous sodium hydroxide solution. The diluted solution was added to 50 milliliters of a 2% by weight suspension of polystyrene particles in which the polystyrene particles had an average diameter of 0.81 micron, which had been dialyzed overnight against 100 volumes of distilled water which had been adjusted to pH 9.0 with aqueous sodium hydroxide solution. The resulting material was brought to a temperature of 50° C. and maintained at that temperature for ten days.

*Example 6.*—25,110 international units of HCG were dissolved in 4.5 milliliters of distilled water which had been adjusted to a pH of 7.4. An amount of crystalline trypsin equal to one-tenth the weight of 25,110 international units of HCG was dissolved in 0.5 milliliter of distilled water which had been adjusted to a pH of 7.4. The enzyme solution was added to the HCG solution and the resulting solution was maintained at a temperature of 37° C. for one hour and then diluted to 50 milliliters with 0.1 M borate buffer, pH 8.68 containing 10% sucrose.

The diluted solution was added to 50 milliliters of a 2% by volume dispersion of polymethacrylic resin particles in which the particles had an average diameter of 0.5 micron, which had been dialyzed overnight against three liters of distilled water.

*Example 7.*—5,000 international units of HCG were dissolved in 4.5 milliliters of distilled water which had been adjusted to a pH of 7.4. An amount of crystalline trypsin equal to one-tenth the weight of 5,000 international units of HCG was dissolved in 0.5 milliliter of distilled water which had been adjusted to a pH of 7.4. The enzyme solution was added to the HCG solution and the resulting solution was maintained at a temperature of 37° C. for one hour and then diluted to 50 milliliters with 0.1 M borate buffer, pH 8.68 containing 10% sucrose.

The diluted solution was added to 50 milliliters of a 2% by volume suspension of polystyrene latex particles in which the particles had an average diameter of 0.15 micron, which had been dialyzed overnight against ten gallons of distilled water.

*Example 8.*—100 milliliters of 0.1% polystyrene latex particles was prepared in 0.2 M borate buffer having a pH of 8.2, the particles having an average diameter of 0.81 micron. 100 milliliters of HCG solution which contained 4,000 international units of HCG in borate buffer having pH 8.2 was slowly added, with stirring, to the polystyrene latex suspension. The HCG-polystyrene latex combination was stored in undisturbed condition at 5° C. for six months to allow settling to occur. 180 milliliters supernatant buffer was then removed and the particles were resuspended in the remaining 20 milliliters of supernatant buffer to give a 1% concentration.

Latex reagent prepared according to the above examples is tested for acceptability for use in the determination of HCG by a serological inhibition test by the following two-step procedure: In the first step, a series of dilutions of a known potent HGC antiserum in imidazole diluent are prepared. The imidazole diluent is prepared by adding 6 milliliters of 0.1 N hydrochloric acid to 25 milliliters of 0.2 M aqueous imidazole solution, diluting to a volume of 100 milliliters with distilled water, adding 0.7 gram of sodium chloride, 0.032 gram of sodium salicylate, 20 milliliters of 30% aqueous bovine albumin solution, and an amount of sodium ethylmercurithiosalicylate such that the concentration of the solution with respect thereto is 1:10,000 v./v. Alternatively, the imidazole diluent may be prepared by adding 1.36 milliliters of 0.1 N hydrochloric acid to 0.3407 gram of imidazole and 7.5 grams of glycine and diluting to a volume of one liter with distilled water. One drop of each dilution of antiserum is mixed on a dark colored slide with one drop of the imidazole diluent. Two drops of the latex reagent are placed on the slide adjacent to said mixture and then mixed with the mixture of antiserum dilution and imidazole diluent. Promptly after mixing is complete, the slide is rocked very slowly and gently and the mixture is visually examined for the development of agglutination. In the second step, a dilution equal to one-half the highest dilution of antiserum which is found according to the first step to cause agglutination to start in fifteen seconds and to be complete within two minutes after rocking of the slide is started is used in an inhibition test with the latex reagent and an HCG solution. In the inhibition test, one drop of the dilution of antiserum is placed on a dark colored slide and mixed for thirty seconds with one drop of a solution in urine from a non-pregnant female containing 10 international units of HCG per milliliter. Two drops of the latex reagent to be tested are mixed with the mixture of antiserum and HCG solution. Promptly after mixing is complete, the slide is rocked slowly and gently and observed for agglutination. The latex reagent is acceptable for use in the inhibition test of this invention if in the second step there is no observable agglutination of its particles within two minutes after final mixing is complete and rocking of the slide has been started.

The following is an example of the preparation and standardization of the antiserum used in the pregnancy test of this invention:

An initial intramuscular injection is made in a rabbit of an emulsion of one milliliter of a 0.9% aqueous sodium chloride solution containing 50,000 international units of HCG and an equal volume of Freund's adjuvant (J. Freund, Ann. Rev. Microbiol., 1947, 1:291). Three intravenous injections of HCG solution are given after six weeks at intervals of two days. Each additional injection comprises 1,000 international units of HCG in solution in one milliliter of 0.9% aqueous sodium chloride solution. Fourteen days after the last injection, the rabbits are bled. Fourteen days after bleeding, the rabbits are injected intravenously on each of three consecutive days with one milliliter of a 0.9% aqueous sodium chloride solution containing 3,300 international units of HCG and rebled one month after the initial bleeding.

In order that a dilution of antiserum having an antibody concentration suitable for use in the inhibition test of this invention be obtained, the antibody concentration of the antiserum is determined in a two-step procedure; a first step to determine the approximate concentration of antibody in the serum and a second step to determine the concentration of antibody in the serum more accurately.

In the first step, the serum from each bleeding is diluted with imidazole diluent to provide solutions containing one part of serum to 100, 200, 300, 400, 500, and 1,000 parts of imidazole diluent. One drop of each serum dilution is placed on a separate black slide and one drop of imidazole diluent is added to each drop of serum dilution and mixed therewith. Two drops of latex reagent which is acceptable for use in the inhibition test, as determined according to the above procedure, are placed on a dark colored slide adjacent to each serum dilution and mixed therewith. Promptly after mixing is complete, each slide is rocked very slowly and gently and the mixture is observed for the development of agglutination. Sera which agglutinates the particles of the latex reagent completely within two minutes at a dilution of one to 300 or at a higher dilution are pooled.

In the second step, progressively higher dilutions of the pooled antiserum in imidazole diluent are made and tested as above in order that the highest dilution showing complete agglutination within two minutes may be determined. The pooled serum is then diluted with the imidazole diluent to a dilution equal to one half the highest dilution which shows complete agglutination within two minutes and the suitability of this dilution is tested by the following inhibition test.

A dilution of HCG in urine from a non-pregnant female is prepared containing ten international units of HCG per milliliter. One drop of each dilution of antiserum is placed on a dark colored slide and one drop of the HCG solution is added to each dilution of antiserum. The mixtures are stirred with an applicator stick for thirty seconds. Two drops of latex reagent which has been found acceptable for use in the inhibition test of this invention, are added to each mixture and mixed with the mixture of antiserum and HCG solution by the use of an applicator stick. Promptly after mixing is complete, each slide is rocked slowly and gently and the mixtures are observed for agglutination. The dilution of antiserum which results in no observable agglutination within two minutes after final mixing is complete and rocking of the slide has been started is used as the standard antiserum for use in the pregnancy test of this invention. If complete inhibition, indicated by lack of agglutination within the two-minute test period, is not achieved with the HCG solution containing 10 international units of HCG per milliliter, the dilution of the antiserum is adjusted by adding concentrated antiserum or by dilution of the antiserum so that complete inhibition is achieved when a solution containing 10 international units of HCG per milliliter is used in the above test.

The inhibition test of this invention for the in vitro serological determination of HCG in urine is practiced by use of the latex reagent of this invention according to the following procedure:

One drop of standardized HCG antiserum is placed on a dark colored slide. One drop of urine to be tested is added to the antiserum and the mixture is stirred with an applicator stick for thirty seconds. Two drops of latex reagent are placed on the slide near the mixture of antiserum and urine and mixed with the mixture of urine and antiserum by use of an applicator stick. Promptly after mixing is complete, the slide is rocked very slowly and gently and the mixture is observed for the development of agglutination. The presence of observable agglutination within exactly two minutes after final mixing is complete and rocking of the slide has been started indicated the absence of HCG in the test urine; the absence of agglutination at the end of the same period of time establishes the presence of HCG in the test urine. A separate control using one drop of physiological sodium chloride solution instead of urine is run with each test.

While the invention has been described with reference to the specific embodiments, it is to be understood that it is not to be limited thereto, but is to be construed broadly and restricted solely by the scope of the appended claims.

What is claimed is:

1. In a reagent for the detection of HCG in urine in which HCG antiserum is used, the reagent comprising a suspension of synthetic resin particles having HCG adsorbed thereon, said particles having an average diameter of from about 0.07 to about 0.90 micron, the improvement which comprises the HCG being altered as to its physical characteristics while retaining its immunological characteristics, said alteration of the HCG being accomplished by subjecting said HCG to treatment with heat, enzymes or a combination of heat and enzymes, the concentration of said particles being within the range of from about 0.5 to about 1.5% by weight and the amount of said HCG adsorbed on said particles being within the range of from about 36 to about 45 international units per milligram of particle weight.

2. A reagent according to claim 1, wherein the pH of said suspension of synthetic resin particles having HCG adsorbed thereon is within the range of about 7.8 to about 8.8.

3. In a reagent for the detection of HCG in urine in which HCG antiserum is used, the reagent comprising a suspension of synthetic resin particles having HCG adsorbed thereon, said particles having an average diameter in a range from about 0.07 to about 0.90 micron, the improvement which comprises the HCG being altered as to its physical characteristics while retaining its immunological characteritsics, said alteration of the HCG being accomplished by heating said HCG to a temperature of about 96° C., cooling said HCG to about 50° C. and maintaining said HCG at about 50° C. for a period of from about two to about three months, the concentration of said particles being within the range of from about 0.5 to about 1.5% by weght and the amount of said HCG adsorbed on said particle being within the range of from about 36 to about 45 international units per milligram of particle weight.

4. A reagent according to claim 3, wherein said particles are polystyrene particles having an average diameter of 0.81 micron.

5. In a reagent for the detection of HCG in urine in which HCG antiserum is used, the reagent comprising the suspension of synthetic resin particles having HCG adsorbed thereon, said particles having an average diameter within the range of from about 0.07 to about 0.90 micron, the improvement which comprises the HCG being altered as to its physical characteristics while retaining its immunological characteristics, said alteration of the HCG being accomplished by enzymatic treatment of HCG, heating said enzyme treated HCG to a temperature of about 50° C. and maintaining said HCG at about 50° C. to a period from about two to three weeks, the concentration of said particles being within the range of about 0.5 to about 1.5% by weight and the amount of said HCG adsorbed on said particles being within the range of from about 36 to about 45 international units per milligram of particle weight.

6. A reagent according to claim 5, wherein said particles are polystyrene particles having an average diameter of about 0.81 micron.

7. A reagent according to claim 5, wherein the pH of said suspension of synthetic resin particles having HCG adsorbed thereon is in the range of about 7.8 to 8.8.

8. A reagent according to claim 5, wherein said concentration of synthetic resin particles within the range of from about 0.8 to about 1.2% by weight and the amount of HCG adsorbed on said particles is within the range of about 40 to about 42 international units per milligram of particle weight.

9. A method for preparing a reagent containing synthetic resin particles having HCG adsorbed thereon used for the serological detection of HCG in urine, which comprises altering the HCG as to its physical characteristics while retaining its immunological characteristics by treating said HCG with heat, enzymatic digestion or a combination of heat and enzymatic digestion.

10. A method for preparing a reagent containing synthetic resin particles having HCG adsorbed thereon to be used for the serological detection of HCG in urine, comprising the steps of:
   (1) adding an aqueous solution of HCG, having a pH within the range of from about 7.0 to about 9.0, to a suspension of said synthetic resin particles having a pH within the range of from about 7.0 to about 9.0, said synthetic resin particles having an average diameter within the range of from about 0.07 to about 0.90 micron, the concentration of said particles in the suspension being within the range of from about 0.5 to about 1.5 percent by weight, and the amount of HCG in the aqueous HCG solution being within the range of from about 720 to about 900 international units of HCG per milliliter of suspension of particles,
   (2) heating the suspension of particles having HCG adsorbed thereon to a temperature of about 96° C.,
   (3) cooling the suspension to about 50° C., and
   (4) maintaining the suspension at about 50° C., for a period of from about two to about three months.

11. The method of claim 10 wherein the synthetic resin particles are polystyrene particles having an average diameter of about 0.81 micron.

12. A method for preparing a reagent containing synthetic resin particles having HCG adsorbed thereon to be used for the serological detection of HCG in urine, comprising the steps of:
   (1) adding an aqueous solution of HCG, having a pH within the range of from about 7.0 to about 9.0, to a suspension of said synthetic resin particles having a pH within the range of from about 7.0 to about 9.0, said synthetic resin particles having an average diameter within the range of from about 0.07 to about 0.90 micron, the concentration of particles in the suspension being within the range of from about 0.5 to about 1.5 percent by weight, and the amount of HCG in the aqueous HCG solution being within the range of from about 720 to about 900 international units of HCG per milliliter of suspension of particles,
   (2) adding to the suspension of particles having HCG adsorbed thereon a solution of trypsin containing, by weight, one-tenth the weight of the particles in the suspension,
   (3) slowly heating the suspension to a temperature of 50° C.,
   (4) maintaining the suspension at 50° C. for a period of from about two to about four weeks.

13. The method of claim 12 wherein the synthetic resin particles are polystyrene particles having an average diameter of about 0.81 micron.

14. A method for preparing a reagent containing synthetic resin particles having HCG adsorbed thereon to be used for the serological detection of HCG in urine, comprising the steps of:
   (1) adding an aqueous solution of trypsin having a pH within the range of from about 6.8 to about 7.2 to an aqueous solution of HCG having a pH within the range of about 6.8 to about 7.2,
   (2) heating the solution of trypsin and HCG to a temperature of about 37° C.,
   (3) maintaining the temperature at about 37° C. for about one hour,
   (4) adjusting the pH of the solution to within the range of about 8.0 to about 9.0,
   (5) adding the solution of HCG to a suspension of said synthetic resin particles having a pH within the range of about 8.0 to about 9.0, the synthetic resin particles having an average diameter within the range of from about 0.07 to about 0.90 micron, the concentration of particles in the suspension being within the range of about 0.5 to about 1.5 percent by weight, and the amount of HCG in the aqueous HCG solution being within the range of from about 720 to about 900 international units per milliliter of suspension of particles,
   (6) heating the suspension of particles having HCG adsorbed thereon to a temperature of about 50° C., and
   (7) maintaining the suspension at about 50° C. for a period of from about two to about four weeks.

15. The method of claim 14 wherein the synthetic resin particles are polystyrene particles having an average diameter of about 0.81 micron.

16. A method of preparing a reagent containing synthetic resin particles having HCG adsorbed thereon to be used for the serological detection of HCG in urine, comprising the steps of:
   (1) adding an aqueous solution of HCG, having a pH within the range of from about 7.0 to about 9.0, to a suspension of said synthetic resin particles having a pH within the range of from about 7.0 to about 9.0, said synthetic resin particles having an average diameter within the range of from about 0.07 to about 0.90 micron, the concentration of the particles in the suspension being within the range of from about 0.5 to about 1.5 percent by weight, and the amount of HCG in the aqueous HCG solution being within the range of from about 720 to about 900 international units of HCG per milliliter of suspension of particles, and
   (2) maintaining the suspension of particles having HCG adsorbed thereon at a temperature of about 5° C. for about six months.

17. The method of claim 16 wherein the synthetic resin particles are polystyrene particles having an average diameter of about 0.81 micron.

18. A method for the detection of HCG in urine by the use of a latex reagent and an HCG antiserum in a serological inhibition test in which the latex reagent comprises a suspension of synthetic resin particles having HCG adsorbed on the particles, the HCG being altered as to its physical characteristics while retaining its immunological characteristics by treatment of said HCG with heat, enzymatic digestion or a combination of heat and enzymatic digestion, said particles having an average diameter within the range of from about 0.07 to about 0.90 micron, the concentration of the particles in said suspension being within the range of from about 0.5 to about 1.5% by weight and the amount of HCG adsorbed on said particles being within the range of from about 36 to about 45 international units per milligram of particle weight; comprising the steps of:
   (1) mixing the HCG antiserum with an equal volume of the urine to be tested for the presence of HCG,
   (2) mixing the mixture of antiserum and urine with an equal volume of the latex reagent, and
   (3) gently agitating the mixture and observing it for agglutination of the particles of the reagent, the absence of agglutination at the end of two minutes after completion of final mixing and after agitation has started establishing the presence of HCG in the urine.

19. A method for the detection of HCG in urine by the use of a latex reagent and an HCG antiserum in a serological inhibition test in which the latex reagent comprises a suspension of synthetic resin particles having HCG adsorbed on the particles, the HCG being altered as to its physical characteristics while retaining its immunological characteristics, said particles having an average diameter within the range of from about 0.07 to about 0.90 micron, the concentration of the particles in the suspension being within the range of from about 0.5 to about 1.5 percent by weight, the pH of the latex reagent being within the range of from about 7.8 to about 8.8, and the amount of HCG adsorbed on the particles being within the range of from about 36 to about 45 international units per milligram of particle weight; comprising the steps of:
  (1) mixing the HCG antiserum with an equal volume of the urine to be tested for the presence of HCG,
  (2) mixing the mixture of antiserum and urine with an equal volume of the latex reagent, and
  (3) gently agitating the mixture and observing it for agglutination of the particles of the reagent, the absence of agglutination at the end of two minutes after completion of final mixing and after agitation has started establishing the presence of HCG in the urine.

20. The method of claim 19 wherein the synthetic resin particles are polystyrene particles having an average diameter of about 0.81 micron.

References Cited by the Examiner

UNITED STATES PATENTS 3,234,096   2/1966   Pollack _____ 167—84.5

OTHER REFERENCES

Chemical Abstracts: vol. 53, entry 1813e, 1959, citing Banik, Ann. Biochem. Exptl. Med. 19, 5–8, 1959.

Chemical Abstracts: vol. 54, entry 1636b, 1960, citing Bourrillon et al., Acta Endocrinol. 31, 553–8, 1959.

LEWIS GOTTS, *Primary Examiner.*

RICHARD L. HUFF, *Assistant Examiner.*